Jan. 19, 1937.   C. E. STARR   2,068,438
SPEED CHANGE AXLE
Filed March 14, 1935
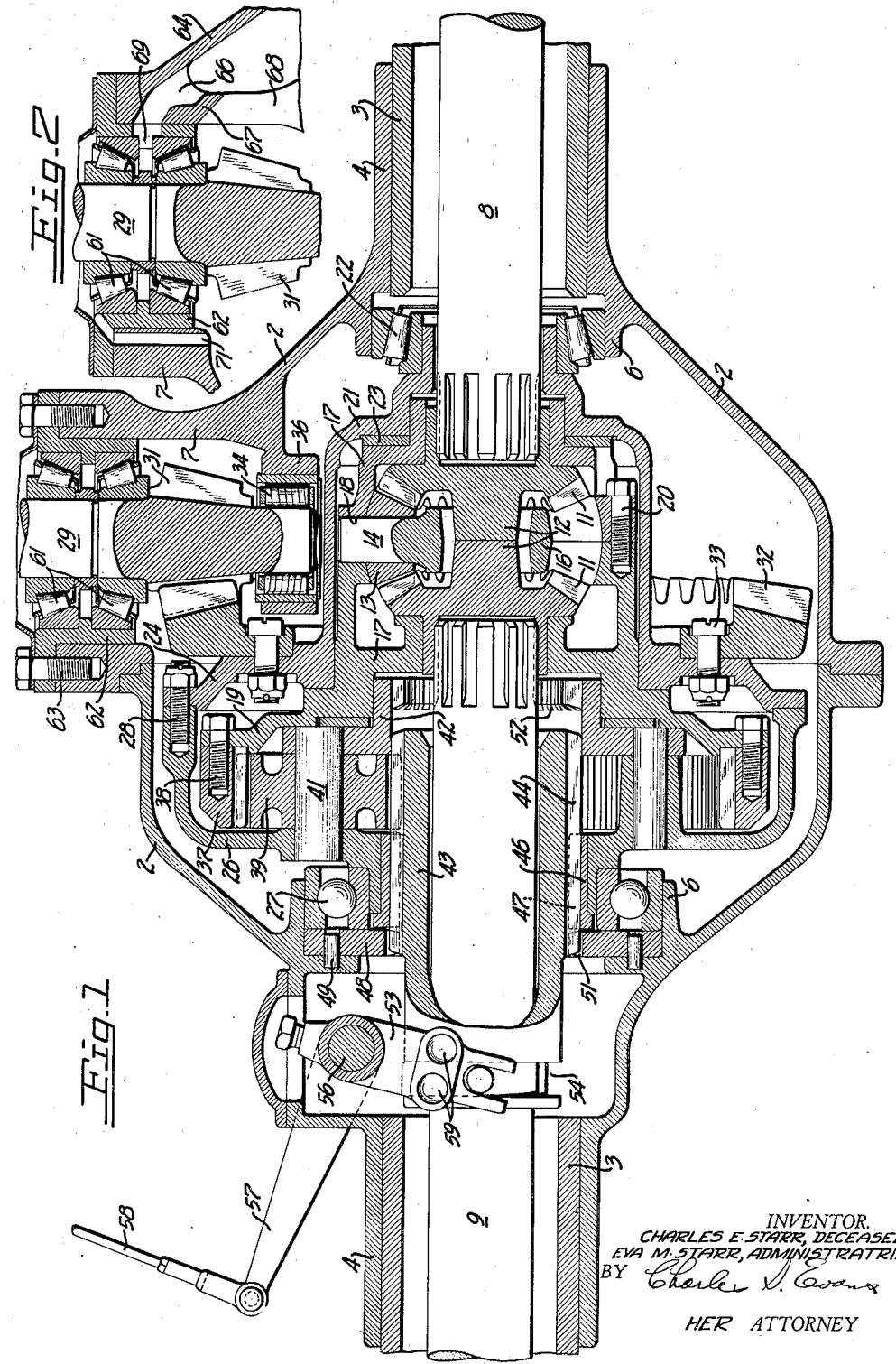
INVENTOR.
CHARLES E. STARR, DECEASED.
EVA M. STARR, ADMINISTRATRIX.
BY Charles V. Evans
HER ATTORNEY Patented Jan. 19, 1937

2,068,438

UNITED STATES PATENT OFFICE 2,068,438

SPEED CHANGE AXLE

Charles E. Starr, deceased, late of Inglewood, Calif., by Eva M. Starr, administratrix, Inglewood, Calif., assignor to Perfecto Gear Differential Co., Bellingham, Wash., a corporation of Washington Application March 14, 1935, Serial No. 11,033

3 Claims. (Cl. 74—314)

The invention relates to rear axles for motor vehicles, and more particularly to those embodying combined differential and planetary gear systems.

It is among the objects of the invention to provide an axle of the character described in which the planetary gear system affords several speed changes.

Another object of the invention is to provide an improved construction in which the design and arrangement of the mechanism contributes to improve the support and efficiency of the mechanical parts.

A further object of the invention is to provide a mechanism of the character described which may be readily installed.

The invention possesses other objects and features of advantage, some of which, with the foregoing, will be set forth in the following description of the invention. It is to be understood that the invention is not limited to this disclosure of species, as various embodiments thereof within the scope of the claims may be adopted.

Referring to the drawing:

Figure 1 is a horizontal sectional view of an axle embodying the improvements of the invention.

Figure 2 is a vertical sectional view taken through the axis of the driving pinion and shows the improved oiling system for the drive shaft bearing.

In terms of broad inclusion, the speed change axle embodying the invention comprises a housing, a pair of axle shafts in the housing and a differential gear system connecting the shafts. A planetary gear system is also provided and is connected with the differential gearing with its ring gear mounted on the differential casing. A rotor is provided encasing both gear systems, and means are provided for driving the rotor. A bearing ring is journalled in the differential casing, and the pinions of the planetary system are arranged with one end mounted on the rotor and the other end mounted on the bearing ring. A sun gear is also provided meshed with the planetary pinions, and means are provided for optionally holding the sun gear against rotation or locking it to the bearing ring.

In greater detail, and referring particularly to the drawing, the speed change axle embodying the invention comprises a split housing 2 adapted for mounting on the axle housings 3 of the automobile. This mounting is effected by a pair of sleeve portions 4 formed on the housing 2 and adapted to receive the inner ends of the axle housings 3.

The differential housing 2 is designed to carry the entire mechanism embodying the invention, and is provided with a pair of annular end brackets 6 formed internally of the differential housing and positioned in axial alignment with the axle housings 3. A neck 7 is also provided on the differential housing 2 for connection with the torque tube of the automobile. The axle shafts 8 and 9 project into the differential housing through the annular supporting brackets 6 and terminate in spaced relation, as clearly shown in the drawing.

A differential gear system is provided within the housing for connecting the axle shafts together. This system comprises a pair of differential gears 11 mounted on opposing ends of the axle. These differential gears are provided with inwardly projecting lugs 12 for holding the gears spaced. The differential system also comprises a differential pinion 13 journalled on an arm 14 of a spider having an annular shaped core 16 encircling the spacing lugs 12 of the gears. The differential assembly is enclosed in a casing 17 journalled on the hubs of the gears 11.

This differential casing is split transversely along the axis of the differential pinion, and the casing is provided with a socket 18 for receiving the arm 14 of the spider. Suitable studs 20 operate to hold the two halves of the casing together, with the spider arm clamped therebetween. One half of the differential casing is also provided with an outwardly extending disk-like flange 19.

A planetary gear system is also provided, connected with the differential gear system, and a rotor is provided for encasing both gear systems. This rotor preferably comprises a bell-shaped end portion 21 surrounding the differential system and journalled at its outer end in a bearing 22 held by the housing bracket 6. This end of the rotor encircles the axle 8 and provides a journal for the adjacent end of the differential casing 17. A bearing plate 23 is preferably interposed between the rotor and casing. The inner end of the rotor portion 21 also provides a journal for the opposite end of the differential casing, as shown. An outwardly extending disk-like flange 24 is also provided on the inner end of the rotor portion 21, and extends outwardly alongside the flange 19 of the differential casing.

The other end of the rotor also comprises a bell-shaped portion 26 journalled at its outer end in a bearing 27 held by the housing bracket 6. This rotor portion encircles the planetary gear system and extends over the flange 19 of the differential casing. The inner end of the rotor portion 26 abuts the peripheral portions of the flange 24 of the opposite rotor portion, and the two are connected together by suitable studs 28.

The rotor therefore is journalled at each end in the differential housing, and is free to rotate about the mechanism which it encloses. The two bearings 22 and 27, in which the ends of the rotor are journalled, provide the main bearings of my unit.

Means are provided for driving the rotor. For this purpose a drive shaft 29 connected with the propellor shaft of the automobile is arranged in the neck 7 of the differential housing. A driving pinion 31 is mounted on the drive shaft and is meshed with a master gear 32 mounted on the side of the rotor flange 24. The master gear is preferably formed as a separate element, and is secured to the rotor flange by suitable bolts 33. The inner end of the drive shaft is journalled in a bearing 34 supported in a bracket 36 formed in the differential housing 2.

The planetary system of my axle comprises a ring gear 37 arranged in the outwardly extending portion of the rotor and mounted on the peripheral portion of the differential casing flange 19 by suitable studs 38. The pinion 39 of the planetary system is journalled on a short shaft 41 mounted at one end on the rotor portion 26 and supported at the other end by a bearing ring 42 journalled in the differential casing 17. By this arrangement the driving torque from the driving pinion 31 is transmitted through the rotor to the planet pinion mounting and hence to the differential casing by way of the planet pinion and ring gear.

Means are provided for cutting the planetary system into and out of the drive. For this purpose a sleeve 43 is slidably mounted within the rotor portion 26 and bearing ring 42. The sleeve 43 is provided with longitudinally extending teeth 44, a portion of which mesh with the planet pinion 39 to provide the sun gear for the planetary system. Since these teeth extend outwardly through the hub portions of the rotor, a sleeve 46 is journalled in the rotor and is provided with inwardly extending teeth 47 meshed with the teeth of the inside sleeve 43. This arrangement provides a slidable journal mounting for the shiftable sleeve 43.

Means are provided for holding the sun gear against rotation to effect planetation of the pinion 39. To this end an annular plate 48 is secured in the end of the housing by suitable pins 49 internally extending teeth 51 are formed on the inside of this ring, with which the teeth 44 of the shiftable sleeve 43 are adapted to mesh when the sleeve is in the outer position, as shown in the drawing. The holding ring 48 in this connection is referred to as a fixed element because of its fixed relation with respect to the housing.

Means are also provided for locking the sun gear to the bearing ring 42, so that the elements of the planetary system are locked together for rotation as a unit. For this purpose suitable teeth 52 are formed on the inside of the bearing ring 42, and with which the teeth 44 of the shiftable sleeve are adapted to mesh when the sleeve is shifted inwardly. It will be seen therefore that there are two operating positions of the sleeve 43; in one position the sleeve being locked to the fixed element 48, and in the other position it being locked to the planet pinion supporting ring 42.

When the shiftable sleeve 43 is locked to the fixed element, as shown in the drawing, the sleeve and consequently the sun gear integral therewith are held against rotation, and the pinion 39 is caused to planetate about the sun gear when the rotor is being driven. Under these conditions the differential casing 17 is caused to rotate with respect to the rotor, and at an increased speed. In other words, an overdrive is provided.

On the other hand, when the shiftable sleeve 43 is locked to the pinion supporting ring 42 the planet pinion 39 is prevented from rotating about its own axis. Under these conditions the elements of the planetary system are locked together for rotation as a unit, which means that the differential casing is locked for rotation directly with the rotor. This gives a speed which is lower than that when the planetary system is functioning in its over drive capacity.

Suitable means are provided for shifting the sleeve 43 to optionally engage the same with either the fixed element or the pinion mounting. The shifting mechanism preferably comprises a yoke 53 engaging an annular groove 54 in the sleeve 43. The yoke is mounted on a shaft 56 journalled in the housing 2, and the shaft is provided with a crank 57 connected with a suitable shifting lever by the rod 58. The latching of the sleeve in either one or the other of its operating positions may be accomplished by providing a suitable spring pressed pin engageable with sockets 59 provided on an arm of the yoke 53.

Means are also preferably provided for oiling the drive shaft bearings 61. The bearing assembly comprises a sleeve 62 for holding the thrust bearings 61 and secured in the end of the housing neck 7 by suitable studs 63. As best shown in Figure 2, the upper wall 64 of the housing slopes downwardly toward the outer end of the neck, so that oil thrown against this wall by the master gear 32, or other rotatable element running in the oil provided in the housing, is directed toward the bearings 61. This oil is collected above the bearings in a suitable oil pocket 66 formed by a plate 67 extending between the inner bearing bracket supporting ribs 68. The lower end of this pocket drains into the bearings 61 through an aperture 69, and then back into the main body of the housing through the passage 71.

What is claimed is:

1. The combination with a differential gear system having a differential casing, of a planetary gear system comprising a ring gear mounted on the differential casing, a rotor, a planet pinion meshed with the ring gear and having one end mounted on the rotor, a ring for supporting the other end of the pinion, a sun gear meshed with the planet pinion, and means for locking the sun gear to said pinion supporting ring.

2. The combination with a differential gear system having a differential casing, of a planetary gear system comprising a ring gear mounted on the differential casing, a rotor, a planet pinion meshed with the ring gear and having one end mounted on the rotor, a ring for supporting the other end of the pinion and journalled on the differential casing, a sun gear meshed with the planet pinion, and means for locking the sun gear to said pinion supporting ring.

3. In a planetary gear system, a rotor, a planet pinion having one end mounted on the rotor, a ring for supporting the other end of the pinion, a shiftable sleeve having longitudinally extending teeth, portions of said teeth meshing with the planet pinion to provide the sun gear for the planetary system, a fixed element, teeth on the fixed element and the pinion supporting ring, a mounting for said sleeve comprising a sleeve journalled in the rotor and embracing the shiftable sleeve and having teeth engaging the teeth of said shiftable sleeve, and means for moving the shiftable sleeve to optionally engage the sleeve teeth with either the teeth on the fixed element or the teeth on the pinion supporting ring.

EVA M. STARR,
*Administratrix of the Estate of Charles E. Starr, Deceased.*